Patented Jan. 13, 1948

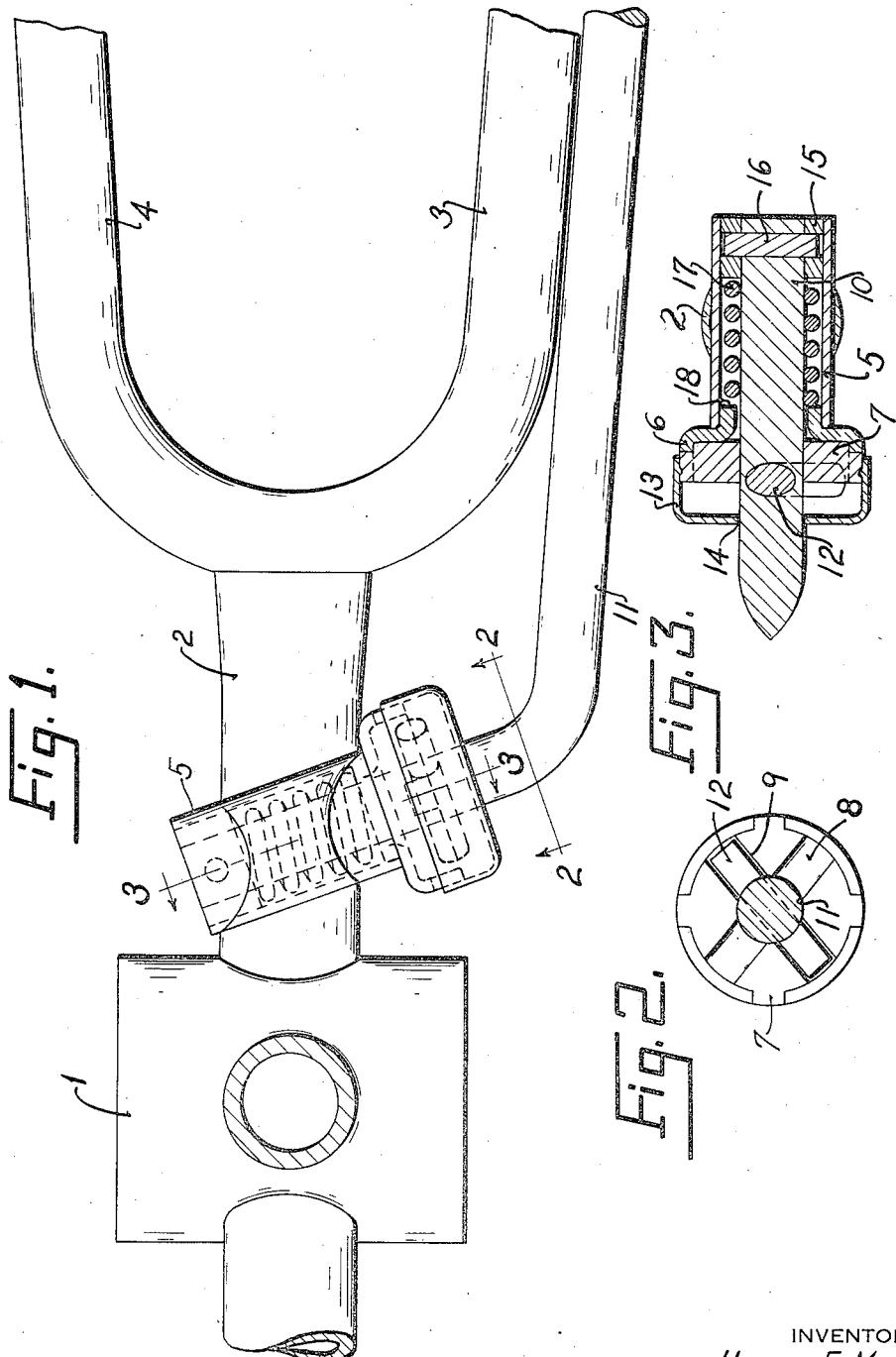

2,434,423

UNITED STATES PATENT OFFICE 2,434,423

BICYCLE STAND

Harold F. Maschin, Westfield, Mass., assignor to The Westfield Manufacturing Company, Westfield, Mass., a corporation of Massachusetts Application April 9, 1946, Serial No. 660,627

2 Claims. (Cl. 280—293)

This invention relates to a rest support for bicycles commonly known as a kick stand, the function of which is to provide a prop for supporting a bicycle in standing position when at rest.

The invention has for its object the provision of a rugged durable and efficient device of this character which may be built into the bicycle frame as a permanent part thereof and in a manner to present a pleasing stream-line appearance. A further object is to provide a casing for enclosing all frictionally engaging parts of the device so as to exclude dust and dirt and include lubricant for easy operation.

To this end the device includes a tubular housing constructed as an integral part of the bicycle frame, arranged horizontally in axial intersecting relation with the tube member of the rear fork of said frame. The usual prop member protrudes from said housing, but all other parts of the device are enclosed and concealed within said housing.

Referring to the drawings:

Fig. 1 is a top view of the device shown in its relation to the rear fork of the bicycle frame, part of which is shown in this view;

Fig. 2 is an end view of the device as it looks from line 2—2 of Fig. 1 with a cap thereof removed; and Fig. 3 is a longitudinal section along line 3—3 of Fig. 1.

Referring more particularly to Fig. 1 of the drawings, the part of a bicycle frame here disclosed shows the crank hanger 1, a single tubular rear fork member 2 and rear fork branches 3 and 4.

The construction of the kick stand for this bicycle frame includes a tubular housing 5 which is formed as an integral part of the frame member 2 and extends horizontally therethrough in axial intersecting relation. By this it is meant that the longitudinal axis of the tubular member 2 and the longitudinal axis of tubular housing 5 will intersect and will both lie in the same horizontal plane common to both of said tubular members. This means further that said tubular members 2 and 5 are symmetrically disposed above and below said plane, and thus contribute toward a pleasing appearance for said assembly.

The left end of the housing 5 is provided with an enlargement or cup shaped portion 6 which is welded fast to the tubular member 5 and which furnishes a recess within which is fitted a cam member 7. This cam member 7 is keyed for lock engagement with the cup member 6 and is also securely welded thereto so that there will be no relative movement between cam member 7, cup enlargement 6 and tubular housing 5. This cam member also serves as a closure for the left end of said housing 5. The outer face of cam member 7 is formed with a pair of angularly disposed positional grooves 8 and 9 and said cam member 7 also has a central bore which provides the left hand bearing for a trunnion 10 of the prop which extends therethrough into the housing 5 as shown. The leg 11 of the prop is bent at an angle to the trunnion 10 as shown in Fig. 1, and serves when adjusted in its depending position to support the bicycle in the well known manner.

A cross pin 12 is mounted in the trunnion 10 of the prop and is adapted to be selectively engaged in the positional grooves 8 and 9 for the different positions of prop leg 11. A cap 13 is fitted over the outer face of the cam member 7 and is detachably secured thereto for covering up the face of the cam and the pin 12. This cap 13 is formed with a center hole 14 whereby it may be fitted over the trunnion 10 during the assembly of the parts.

The right hand end of trunnion 10 has fixed thereto, the bushing 15 which is fitted for slidable and rotatable movement in the right hand end of housing 5 so as to serve as a bearing for this end of the trunnion 10, and also as a closure for the right end of housing 5. Pin 16 is provided to secure the bushing 15 to the trunnion 10. Enclosed within the housing 5 is a coiled spring 17, one end of which bears against the bushing 15 and the other end of which bears against a shoulder 18 in housing 5 and thereby acts to impose a constant thrust on bushing 15 and trunnion 10 which tends to move the latter to the right and press the cross pin 12 into engagement with the face of cam 7. The spring 17 is coiled about the trunnion 10 and is slightly spaced from contact with the inner surface of said housing 5, as shown in the drawing so as to provide the necessary clearance for a free working action of said spring without frictional engagement with said housing.

From the above construction it will be obvious that the kick stand comprises a prop leg 11 which may be positioned horizontally and substantially parallel to the rear fork member 3 in which position the cross pin 12 engages in groove 9. Or the prop leg 11 may be swung or kicked downwardly into a depending vertical position whereby its cross pin 12 will engage in the other groove 8 of the cam 7 and be yieldingly held in this position so as to support the bicycle at rest in the usual manner.

What I claim is:

1. The combination with a bicycle frame having a tubular rear fork member, of a kick stand comprising a tubular housing formed as an integral part of said fork member and extending horizontally through said fork member in axial intersecting relation, a prop comprising a trunnion extended within said housing and a bent leg extended outwardly thereof, a rotatable and slidable bushing fixed to said trunnion and fitted as a closure for one end of said housing, a stationary cam member through which said trunnion extends and fitted as a closure for the other end of said housing, said cam member having an outer face adjacent said bent leg formed with two positional grooves in angular relation, means on said bent leg to engage said grooves, and a spring enclosed within said housing acting against said bushing to press the bent leg engaging means against said cam face, the angular relation of said cam grooves being such that said bent leg may be yieldingly adjusted in position either substantially parallel with said fork member or in depending vertical relation thereto.

2. The combination with a bicycle frame having a tubular rear fork member, of a kick stand comprising a tubular housing formed as an integral part of said fork member and extending horizontally through said fork member in axial intersecting relation, a prop comprising a trunnion extended within said housing and a bent leg extended outwardly thereof, a rotatable and slidable bushing fixed to said trunnion and fitted as a closure for one end of said housing, the other end of said housing being enlarged, a stationary cam member through which said trunnion extends being fitted as a closure into said housing enlargement in fixed relation thereto, said cam member having an outer face adjacent said bent leg formed with two positional grooves in angular relation, a cross pin on said bent leg adapted for engagement in said positional grooves, a cap member fitted over the outer side of said cam member serving as an enclosing housing for the cross pin and cam grooves and a spring enclosed within said housing acting against said bushing to press the cross pin of said bent leg against said cam face for engaging said positional grooves, the angular relation of said cam grooves being such that said bent leg may be yieldingly adjusted in position either substantially parallel with said fork member or in depending vertical relation thereto.

HAROLD F. MASCHIN.

REFERENCES CITED

The following references are of record in the file of this patent:

UNITED STATES PATENTS

| Number | Name | Date |
|---|---|---|
| 2,049,218 | Miller | July 28, 1936 |

FOREIGN PATENTS

| Number | Country | Date |
|---|---|---|
| 393,741 | France | Nov. 5, 1908 |